US012779934B2

(12) United States Patent

Sommers et al.

(10) Patent No.: US 12,779,934 B2

(45) Date of Patent: Nov. 3, 2026

(54) SYSTEM FOR TRANSPORTING PERISHABLE GOODS UTILIZING PHASE CHANGE MATERIALS AND WASTE HEAT

(71) Applicants: Caleb Arthur Sommers, Hamilton, OH (US); Louise Miranda Schuler, Hamilton, OH (US); Killian James O'Connor, Hamilton, OH (US); Katherine Anna Meyer, Hamilton, OH (US); Hailee Longworth, Hamilton, OH (US); Grant James Geiger, Hamilton, OH (US); Lauren Grace Brudzinski, Hamilton, OH (US); Joshua Mick Blust, Jr., Hamilton, OH (US)

(72) Inventors: Caleb Arthur Sommers, Hamilton, OH (US); Louise Miranda Schuler, Hamilton, OH (US); Killian James O'Connor, Hamilton, OH (US); Katherine Anna Meyer, Hamilton, OH (US); Hailee Longworth, Hamilton, OH (US); Grant James Geiger, Hamilton, OH (US); Lauren Grace Brudzinski, Hamilton, OH (US); Joshua Mick Blust, Jr., Hamilton, OH (US)

( * ) Notice: Subject to any disclaimer, the term of this patent is extended or adjusted under 35 U.S.C. 154(b) by 0 days.

(21) Appl. No.: 17/821,823

(22) Filed: Aug. 24, 2022

(65) Prior Publication Data

US 2024/0066942 A1 Feb. 29, 2024

(51) Int. Cl.
*B60H 1/00* (2006.01)
*B60P 3/20* (2006.01)

(52) U.S. Cl.
CPC ........... *B60H 1/00328* (2013.01); *B60P 3/20* (2013.01)

(58) Field of Classification Search
CPC . F28F 21/006; F28F 7/02; F25B 9/145; F25B 2309/1406; F25B 2309/1415
See application file for complete search history.

(56) References Cited

U.S. PATENT DOCUMENTS 6,308,518 B1 * 10/2001 Hunter .................... F25B 21/02 62/3.6
6,758,057 B2 * 7/2004 Vince, II ................ F25D 16/00 62/332

(Continued)

FOREIGN PATENT DOCUMENTS

CN 103282717 B * 4/2016 ......... B65D 81/3802
CN 114156400 A * 3/2022

(Continued)

OTHER PUBLICATIONS

Dr. Ezideen A. Hasso, Mechanical Instrumentations: 001.0 Introduction (Year: 2019) https://engineering.tiu.edu.iq/mechatronics/wp-content/uploads/2019/10/Mechatronics-Instrumentation-001.0.pdf.*

(Continued)

*Primary Examiner* — Ljiljana V. Ciric

(74) *Attorney, Agent, or Firm* — Peter D. Meyer; Larry L. Huston

(57) ABSTRACT

A system for transporting perishable goods which includes a refrigerated semi-trailer. The semi-trailer has a phase change material disposed in a first thermodynamic state for cooling the perishable goods. A heat source and at least one passive electromotive force generator are operably coupled to the phase change material. Electromotive force from the passive electromotive force generator causes a phase change in the phase change material from the first thermodynamic state to a second thermodynamic state, thereby cooling the perishable goods.

17 Claims, 9 Drawing Sheets

(56) References Cited

U.S. PATENT DOCUMENTS

| | | | | |
|---|---|---|---|---|
| 8,522,859 | B2 * | 9/2013 | Moilala | F28D 20/021 165/10 |
| 9,821,700 | B2 * | 11/2017 | Rajtmajer | B60H 1/3208 |
| 9,890,975 | B2 * | 2/2018 | Zelissen | F25B 21/02 |
| 9,939,141 | B2 * | 4/2018 | Surdeanu | H01L 23/4275 |
| 11,245,142 | B2 * | 2/2022 | Bruce | H10N 10/13 |
| 11,322,673 | B2 * | 5/2022 | Lee | H10N 10/17 |
| 11,466,919 | B2 * | 10/2022 | Alexander | F25D 3/06 |
| 2008/0092559 | A1 * | 4/2008 | Williams | F28D 20/021 62/333 |
| 2008/0105219 | A1 * | 5/2008 | Corley | F02B 61/00 123/3 |
| 2010/0236769 | A1 * | 9/2010 | Lyons | B60H 1/00492 165/200 |
| 2015/0034139 | A1 * | 2/2015 | Gurevich | H10N 10/17 136/211 |
| 2015/0176875 | A1 * | 6/2015 | Rigaud | F25B 17/08 165/63 |
| 2017/0292759 | A1 * | 10/2017 | Al-Hallaj | B60H 1/00014 |
| 2018/0056769 | A1 * | 3/2018 | Kerspe | B60K 1/04 |
| 2019/0210425 | A1 * | 7/2019 | Azzouz | B60H 1/00328 |
| 2020/0294401 | A1 * | 9/2020 | Kerecsen | G05D 1/0287 |
| 2020/0393173 | A1 * | 12/2020 | Temple | F25B 41/22 |
| 2021/0061057 | A1 * | 3/2021 | Bauer | B60H 1/2209 |
| 2022/0115590 | A1 * | 4/2022 | Khan | H10N 70/8828 |
| 2022/0376157 | A1 * | 11/2022 | Fish | H10N 10/13 |
| 2022/0402326 | A1 * | 12/2022 | Koelsch | B60H 1/00014 |
| 2024/0066942 | A1 * | 2/2024 | Sommers | B60P 3/20 |

FOREIGN PATENT DOCUMENTS

| | | | | |
|---|---|---|---|---|
| DE | 102014119080 | A1 * | 6/2016 | |
| EP | 1421323 | B1 * | 3/2008 | F25B 21/02 |
| EP | 2505913 | A1 * | 10/2012 | F21S 2/005 |
| GB | 2442739 | A * | 4/2008 | B60H 1/00014 |
| JP | 2017150811 | A * | 8/2017 | F25D 23/06 |
| KR | 101150931 | B1 * | 5/2012 | H10N 10/10 |
| KR | 101682553 | B1 * | 12/2016 | B60J 7/0007 |
| VN | 10030751 | B * | 1/2022 | F25D 23/06 |
| WO | WO-03019093 | A1 * | 3/2003 | F25B 21/02 |
| WO | WO-2014129886 | A1 * | 8/2014 | F25B 21/02 |
| WO | WO-2022266169 | A1 * | 12/2022 | |

OTHER PUBLICATIONS

Transient Modeling of a Thermosiphon based Air Conditioner with Compact Thermal Storage: Modeling and Validation (Year: 2016) https://core.ac.uk/download/pdf/220146956.pdf.*

Non-Contact Temperature Sensors (Year: 2018) https://instrumentationtools.com/non-contact-temperature-sensors/.*

Dhumane et al., "Transient Modeling of a Thermosiphon baseed Air Conditioner with Compact Thermal Storge: Modeling and Validation", International Refrigeration and Air Conditioning Conference, School of Mechanical Engineering, Purdue e-Pubs [online], [retrieved from the internet on Aug. 17, 2026]. (Year: 2016).*

* cited by examiner

SYSTEM FOR TRANSPORTING PERISHABLE GOODS UTILIZING PHASE CHANGE MATERIALS AND WASTE HEAT

FIELD OF THE INVENTION

The present disclosure relates to a system for the transportation of perishable goods such as fruits, vegetables, meats, and the like. In particular, the present disclosure provides a system that provides a refrigeration system that substantially reduces the need for fossil fuels that create unnecessary $CO_2$ emissions and reduces the need for ozone-depleting refrigerants.

BACKGROUND OF THE INVENTION

The transportation of perishable goods such as fruits, vegetables, meats, and the like, is particularly problematic due to the shipping challenges they pose during the summer months or in warmer climates. Similarly, the transportation of perishable goods that require heating during transportation can be particularly problematic during the winter months or in cooler climates.

Exemplary prior art refrigerator trucks and vans (shown in FIG. 1) and prior art refrigerated trailers (commonly referred to as reefers—shown in FIG. 2) are designed to carry perishable freight at low temperatures. Most long-distance refrigerated transport by truck is done with an articulated truck (e.g., a tractor) that pulls a refrigerated semi-trailer 50 (also called a reefer trailer). These transportation systems typically have a refrigeration unit 60 attached to the front (nose) 70 of the trailer. Alternatively, refrigerator trucks 80 (such as a van or truck) can have a refrigeration unit 60A attached thereto, can be ice-cooled, equipped with any one of a variety of mechanical refrigeration systems powered by small displacement diesel engines 90, or utilize carbon dioxide (either as dry ice or in liquid form) as a cooling agent.

One of skill in the art will readily appreciate how a refrigerated truck 80 and/or trailer 50 works. It is important to note that the cooling system of a refrigerated truck and/or trailer is a closed loop (i.e., there is no discernable start or end point) refrigeration system. In any regard, one of skill in the art will recognize that such refrigeration vehicles 80 and trailers 50 use a refrigeration system 60, 60A having essentially three parts: 1. An evaporator coil, 2. A compressor (which powers the evaporator coil), and 3. A dedicated engine system 95 (which powers the compressor). Variations in air pressure create air flow. As air from inside the refrigeration truck 80 or trailer 50 passes over the evaporator coil, it removes heat and redistributes the now colder air back throughout the trailer. Some refrigeration trucks may have a compressor attached to the engine and powered by the truck's belt system. In either case, the compressor acts on the system's refrigerant gas, compressing it and sending it to the condenser.

Situated on the reefer trailer 50—typically facing the vehicle—the refrigeration unit 60, 60A has a condenser that receives concentrated refrigerant gas and converts it into a liquid. This occurs as the refrigerant passes through small, convoluted tubes that expose the refrigerant gas to the outside air. The high surface area ratio of these small tubes allows for maximum cooling that can result in a cooled, liquified refrigerant.

The refrigerant then travels to the condenser located within the reefer trailer 50 itself. This is the point at which heat that would circulate around the perishable product contained therein and as it exits is drawn in by the cool refrigerant. As the refrigerant heats up, it becomes gaseous again and eventually travels back to the compressor to restart the process.

The need for such transportation systems cannot be overstated. For example, while most people love chocolate, they may not be aware of the shipping challenges it poses during the summer months or in warmer climates. To solve this unique challenge, The Hershey® Company sought ideas for the development of a lightweight and affordable cool-shipping system that would keep chocolate close to the temperature at which it was packed for at least 48 hours.

To this end, The Hershey® Company decided that a way to solve this challenge was to take it to the same people who love chocolate through a crowdsourcing competition that would help them discover and develop innovative technology ideas. The contest was designed to identify new systems or materials that would allow chocolate to be shipped in warm weather without the need for gel packs and other labor- and cost-intensive cooling solutions. The ultimate goal was to develop a system that would be inexpensive enough to use year round as part of the standard packaging for consumers' chocolate shipments. Participants in the competition were vying for $25,000 in development funds and the opportunity to further collaborate with Hershey® to develop proposed solutions.

Other industries require the use of refrigerated product transportation as well. For example, the agricultural industry requires that sweet corn be immediately cooled after harvest to prevent the sugar contained therein from turning to starch—thereby reducing quality. To do that, corn shippers often dump ice on top of the corn after harvest, then again once it is loaded in the trailer, where it will slowly melt during transit.

The food industry requires ice cream to come off the production line at a higher temperature than it ships at. If the shipper does not already have the ice cream pre-cooled to the appropriate temperature, it doesn't matter if the driver has their trailer pre-cooled to a −20 degrees Fahrenheit deep-freeze there is a chance the product will be rejected upon arrival.

Similarly, as fresh fruits and vegetables become ready for harvest, the clock starts ticking. These products must be delivered by a certain date, or the food will spoil, and the shipper won't make any money. Many reefer carriers will move some or all of their capacity to service these high-paying, seasonal produce shippers in order to lengthen the product shelf-life.

One of skill in the art understands that there are more than 500,000 refrigerated trailers 50 in service in the United States. When running under normal conditions, a stand-alone and specific reefer trailer 50 diesel tank having a capacity of 50 gallons can last for 4 to 5 days to power the trailer 50 refrigeration unit. Most reefer trailer 50 units use between 0.5 and 1 gallon of reefer diesel per hour. One having knowledge in the industry understands that about 22.38 pounds of $CO_2$ are produced by burning one gallon of diesel fuel. This amounts to a range of from about $1.34\times10^8$ to about $2.69\times10^8$ pounds of $CO_2$ emissions produced by the entire U.S. fleet per day in diesel fuel emissions. In addition to the required refrigeration equipment, each refrigerated trailer 50 contains approximately 1,000 pounds of expensive foam insulation.

To put this number in perspective, the loss in the total reduction of $CO_2$ emissions produced by the entire fleet of U.S. refrigeration vehicles 80 and trailers 50 is equivalent to the conversion of every home in Cincinnati, Dayton, and Cleveland, OH to solar energy. Stated in yet another way, the reduction of this volume of $CO_2$ emissions produced by the U.S. fleet of refrigeration vehicles 80 and trailers 50 is equivalent to removing from about 37 to about 74 vehicles from the road each day.

Additionally, hydrofluorocarbon refrigerants (HFC) have been the refrigerant of choice for the majority of refrigerated containers, refrigerated vans, trucks or trailer-mounted refrigerated systems and refrigerated railcars. Leakage of these HFCs is known to be responsible for depletion of the Earth's ozone layer.

For example, innumerable studies have found that HFC emissions will be the highest contributor to global warming in 2050. It was also found that these gases indirectly contribute to ozone depletion. These HFC emissions cause increased warming of the stratosphere, speed up the chemical reactions that destroy ozone molecules, and also decrease ozone levels in the tropics by accelerating the upward movement of ozone-poor air. According to the model, the impact is such that HFCs will cause a 0.035 percent decrease in ozone by 2050.

Accordingly, there continues to be a need for a new and environmentally-friendly refrigeration system suitable for use in the transportation of perishable goods. Such a system would provide a refrigeration system that substantially reduces the need for fossil fuels that create unnecessary $CO_2$ emissions and reduces the need for ozone-depleting refrigerants.

SUMMARY OF THE INVENTION

The present disclosure provides a system for transporting perishable goods. The system for transporting perishable goods comprises a perishable goods transportation device for containing and transporting perishable goods and having a phase change material (PCM) disposed in a first thermodynamic state disposed therein, a heat source, at least one passive electromotive force (EMF) generator, and a PCM re-constitution system operably coupled to the PCM. The perishable goods transportation device comprises a refrigerated semi-trailer for containing said perishable goods disposed therein. The PCM transitions from the first thermodynamic state to a second thermodynamic state with a first change in enthalpy over time thereby heating or cooling the perishable goods disposed within the refrigerated semi-trailer. The EMF generator generates an EMF when the EMF generator is operably coupled to the heat source. The PCM re-constitution system is in electrical communication with EMF and provides a second change in enthalpy over time to the PCM causing the PCM disposed in the second thermodynamic state to transition from the second thermodynamic state to the first thermodynamic state.

DETAILED DESCRIPTION OF THE INVENTION

Figure 1:
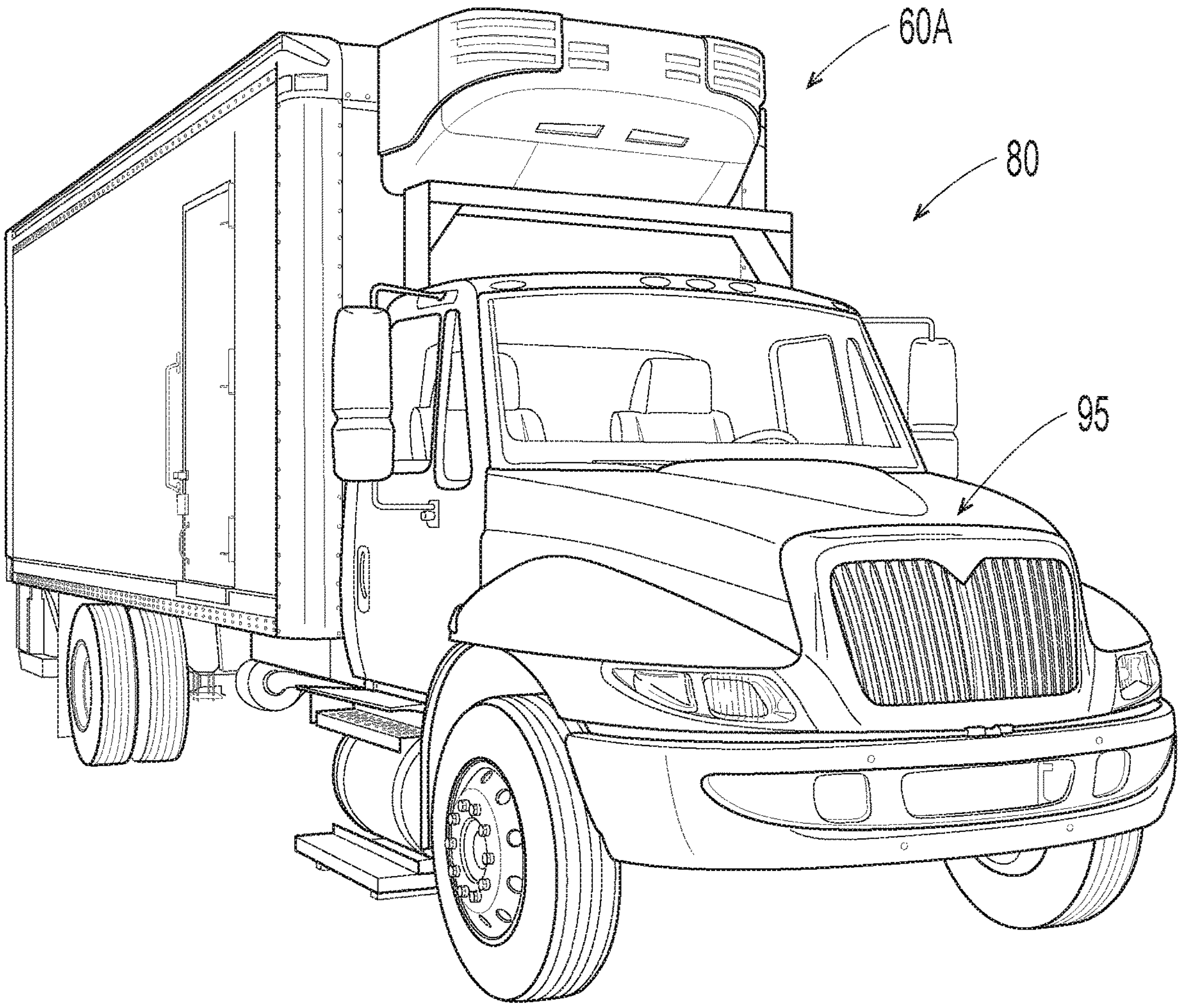
Fig. 1 (PRIOR ART)
FIG. 1. is a photograph of an exemplary prior art refrigerated truck.
Figure 2:
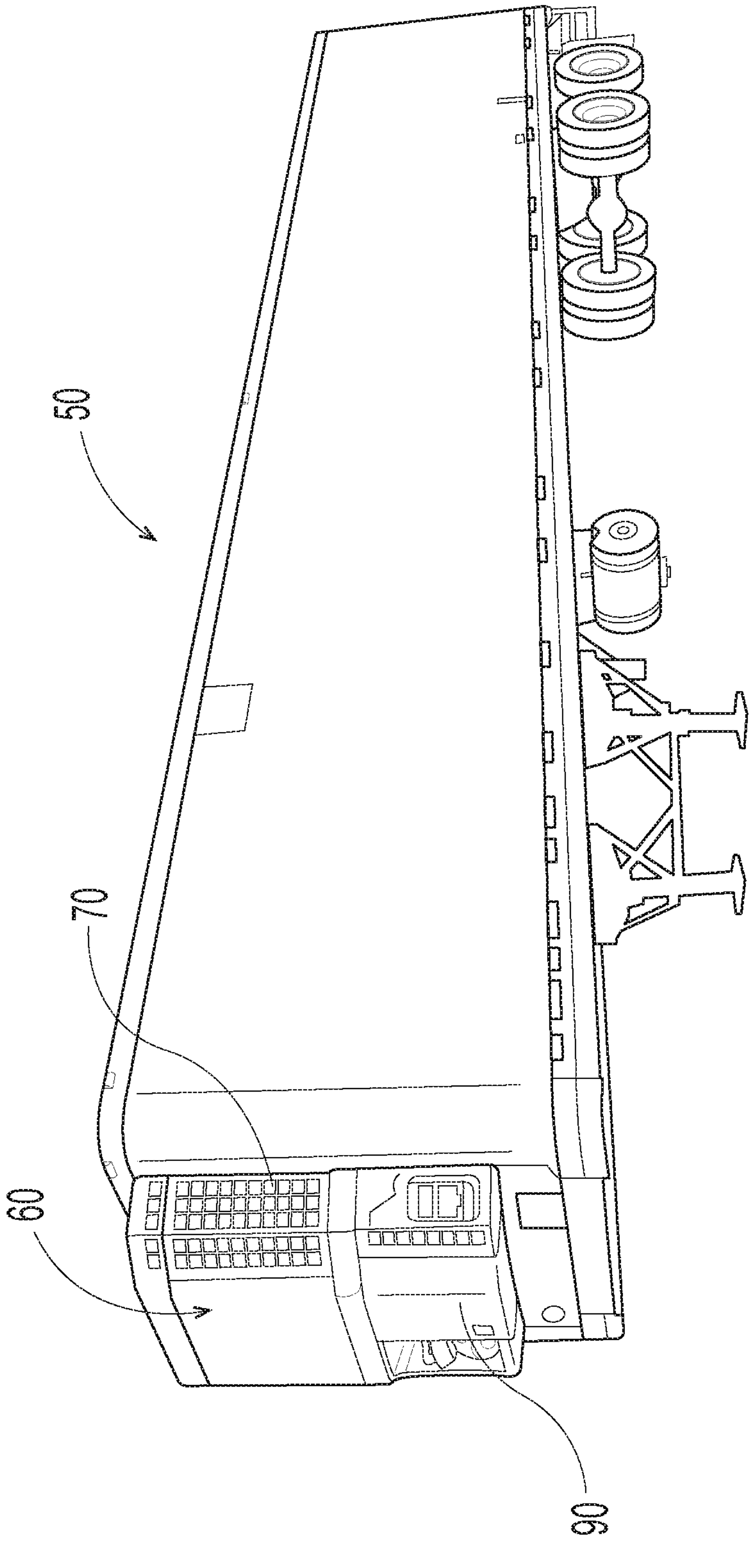
Fig. 2 (PRIOR ART)
FIG. 2 is a photograph of an exemplary prior art refrigerated trailer.

A system for transporting perishable goods 100 utilizing phase change materials and waste heat is generally described as comprising a phase change material 200 disposed within at least a portion of a perishable goods transportation device 110, a heat source 300 generally in the form of an internal combustion engine, a passive electromotive force (EMF) generator 400 that utilizes waste heat generated by the heat source 300, and a phase change material re-constitution system 500 that is operable by way of the EMF generated by the EMF generator 400 that recharges the phase change material. Various elements comprising the system for transporting perishable goods 100 will be discussed individually infra.

Figure 3:
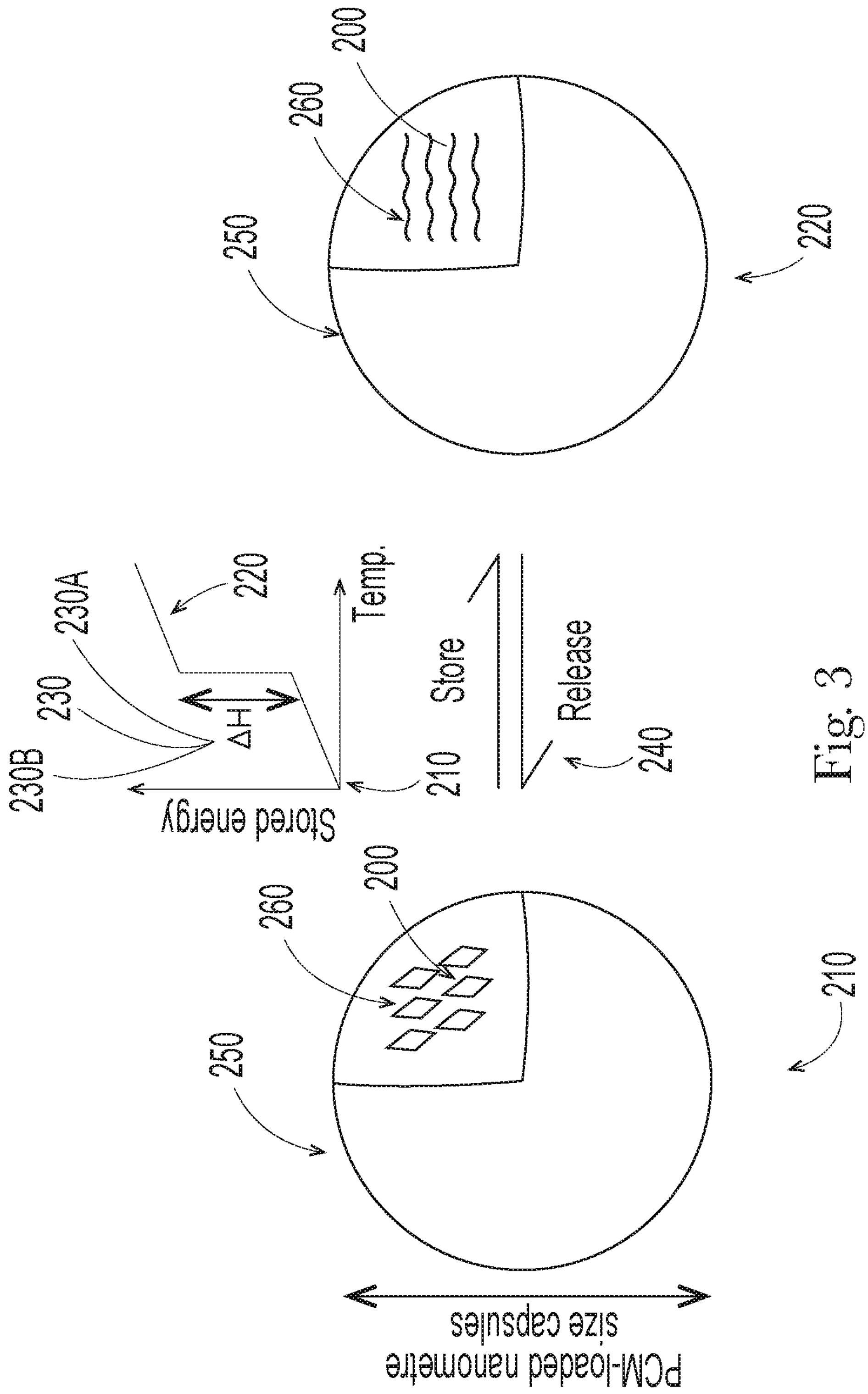
Fig. 3 (PRIOR ART)
FIG. 3 is a plan view of an exemplary phase change material (PCM) suitable for use with the system for transporting perishable goods of FIG. 10 of the present disclosure and an exemplary phase diagram for the representative PCM.

Referring to FIG. 3, a phase change material (PCM) 200 is a substance that releases/absorbs or stores sufficient energy at phase transition 240 to provide useful heat/cooling. Generally, the phase transition 240 will be from one of the first two fundamental states of matter—solid and/or liquid—to the other. The phase transition 240 may also be between non-classical states of matter, such as the conformity of crystals, where the material goes from conforming to one crystalline structure to conforming to another, which may be in a higher or lower energy state.

The energy released/absorbed by the PCM phase transition 240 from solid to liquid, or vice versa, the heat of fusion 230, is generally much higher than the sensible heat. Ice, for example, requires 333.55 J/g to melt. The water temperature will then rise one degree further with the addition of just an additional 4.18 J/g. Water/ice can therefore be a useful PCM 200 and has been used to store 'winter cold' to cool buildings during the summer months since at least the time of the Achaemenid Empire.

By melting and solidifying at the phase change temperature (PCT), a PCM 200 is capable of storing and releasing large amounts of energy compared to sensible heat storage. Heat is absorbed, or released, when the material changes from solid to liquid and vice versa or when the internal structure of the material changes. PCMs are, accordingly, referred to as latent heat storage (LHS) materials.

There are two principal classes of PCM 200: organic (carbon-containing) materials derived either from petroleum, plants, and animals; and salt hydrates, which generally either use natural sea salts, mineral deposits, or are the by-products of other processes. A third, lesser known, class of PCMs are sometimes referred to as solid-to-solid phase change materials.

As shown in FIG. 3, initially, solid-liquid PCMs behave like sensible heat storage (SHS) materials—their temperature rises as they absorb heat. Unlike conventional SHS materials, however, when PCMs reach their phase change temperature (i.e., their melting point) they absorb large amounts of heat at an almost constant temperature until all the material is melted. When the ambient temperature around the liquid material falls, the PCM 200 solidifies, releasing the stored latent heat.

A large number of PCMs are available in any required temperature range from about −5° C. to about 190° C. Between 20° C. and 30° C., some PCMs can be remarkably effective, storing over 200 kJ/kg of latent heat, as against a specific heat capacity of around one kJ/(kg*° C.). The storage density of a PCM can therefore be 20 times greater than masonry per kg if a temperature swing of 10° C. is allowed. However, since the mass of masonry is far higher than that of PCM 200 this specific (per mass) heat capacity is somewhat offset. A masonry wall might have a mass of 200 kg/$m^2$, so to double the heat capacity, one would require additional 10 kg/$m^2$ of PCM 200.

Without limitation, organic PCMs include hydrocarbons, primarily paraffins (i.e., $C_nH_{2n+2}$), lipids (fatty acids and esters), various sugar alcohols, combinations thereof, and the like. Exemplary organic PCMs include: Paraffin 14 to Paraffin 34—Carbons, Formic acid, Caprilic acid, Glycerin, p-Lattic acid, Methyl palmitate, Camphenilone, Docasyl bromide, Caprylone, Phenol, Heptadecanone, 1-Cyclohexylooctadecane, 4-Heptadacanone, p-Joluidine, Cyanamide, Methyl eicosanate, 3-Heptadecanone, 2-Heptadecanone, Hydrocinnamic acid, Cetyl acid, a-Nepthylamine, Camphene, O-Nitroaniline, 9-Heptadecanone, Thymol, Methyl behenate, Diphenyl amine, p-Dichlorobenzene, Oxolate, Hypophosphoric acid, O-Xylene dichloride, β-Chloroacetic acid, Chloroacetic acid, Nitro naphthalene, Trimyristin, Heptaudecanoic acid, a-Chloroacetic acid, Bees wax, Glyolic acid, Glycolic acid, p-Bromophenol, Azobenzene, Acrylic acid, Dinto toluent (2,4), Phenylacetic acid, Thiosinamine, Bromcamphor, Durene, Methyl bromobenzoate, Alpha napthol, Glautaric acid, p-Xylene dichloride, Catechol, Quinone, Actanilide, Succinic anhydride, Benzoic acid, Stilbene, Benzamide, Acetic acid, Polyethylene glycol 600, Capric acid, Eladic acid, Pentadecanoic acid, Tristearin, Myristic acid, Palmatic acid, Stearic acid, Acetamide, and Methyl fumarate.

Exemplary inorganic PCMs include salt hydrates ($M_xN_yH_2O$). Exemplary organic PCMs include: Water, Sodium sulfate ($Na_2SO_4 \cdot 10H_2O$), $NaCl \cdot Na_2SO_4 \cdot 10H_2O$, Lauric acid, TME (63%)/$H_2O$ (37%), $LiNO_3 \cdot 3H_2O$, $Mn(NO_3)_2 \cdot 6H_2O/MnCl_2 \cdot 4H_2O$ (4%), $Na_2SiO_3 \cdot 5H_2O$, Aluminum, Copper, Gold, Iron, Lead, Lithium, Silver, Titanium, Zinc, $NaNO_3$, $NaNO_2$, NaOH, $KNO_3$, KOH, NaOH/$Na_2CO_3$ (7.2%), NaCl (26.8%)/NaOH, NaCl/KCL (32.4%)/LiCl (32.8%), NaCl (5.7%)/$NaNO_3$ (85.5%)/$Na_2SO_4$, NaCl/$NaNO_3$ (5.0%), NaCl (5.0%)/$NaNO_3$, NaCl (42.5%)/KCl (20.5%)/$MgCl_2$, $KNO_3$ (10%)/$NaNO_3$, $KNO_3$/KCl (4.5%), and $KNO_3$/KBr (4.7%)/KCl (7.3%).

Additionally, a specialized group of solid-solid PCMs that undergo a solid/solid phase transition with the associated absorption and release of large amounts of heat are also suitable for use consistent with the present disclosure. These materials change their crystalline structure from one lattice configuration to another at a fixed and well-defined temperature, and the transformation can involve latent heats comparable to the most effective solid/liquid PCMs. Such materials are useful because, unlike solid/liquid PCMs, they do not require nucleation to prevent supercooling. Currently the temperature range of solid-solid PCM 200 solutions spans from about −50° C. (−58° F.) up to about 175° C. (347° F.).

Typical solid-liquid PCMs 200 can be encapsulated 250 for installation in the end application, to contain the liquid state. One of skill in the art will readily recognize that micro-encapsulation 250 can facilitate a PCM 200 to be incorporated into materials economically. Micro-encapsulation can allow a PCM 200 to remain solid, in the form of small bubbles, when the PCM 200 core 260 has melted.

In addition to coating a microscopic sized PCM 200 with a protective coating 250, the PCM 200 particles can be suspended within a continuous phase such as water. Such a system could be considered by one of skill in the art as a phase change slurry (PCS).

Additionally, molecular-encapsulation can allow a very high concentration of PCM 200 within a polymer compound. Exemplary molecular-encapsulated PCMs can have a storage capacity up to 515 kJ/m2. Further, molecular-encapsulation allows drilling and cutting through the material without any PCM 200 leakage.

Latent heat storage can be achieved through changes in the state of matter from liquid→solid, solid→liquid, solid→gas, and liquid→gas. However, it is believed that solid→liquid and liquid→solid phase changes are practical for PCM 200 of the present disclosure. Although liquid→gas transitions typically have a higher heat of transformation than solid→liquid transitions, liquid→gas phase changes may be impractical for thermal storage because large volumes or high pressures are required to store the materials in their gas phase. Solid→solid phase changes are typically very slow and have a relatively low heat of transformation.

Figure 10:
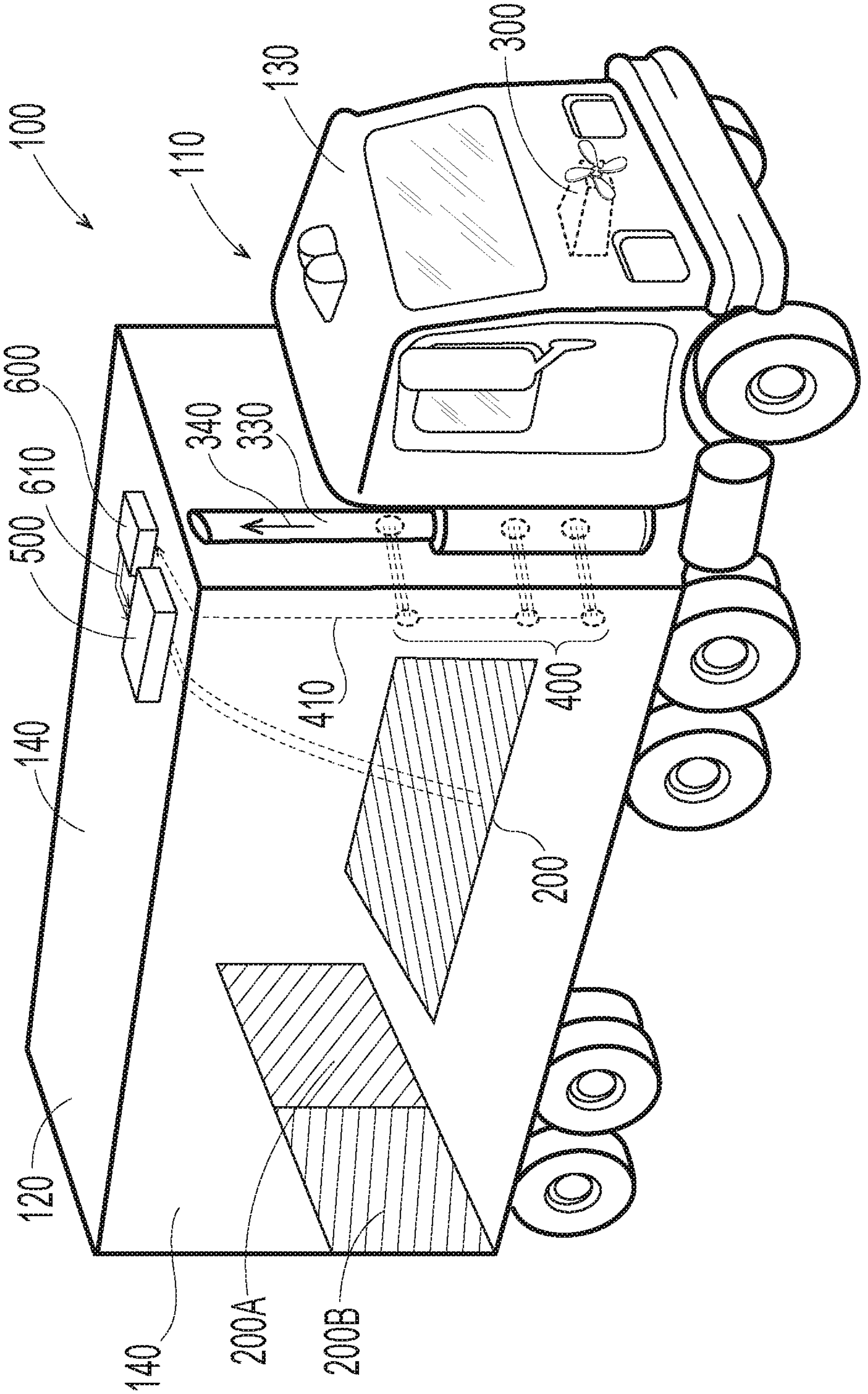
FIG. 10 is a perspective view of an exemplary system for transporting perishable goods; and, FIG. 11 is a perspective view of an exemplary heat source for a system for transporting perishable goods.
Figure 11:
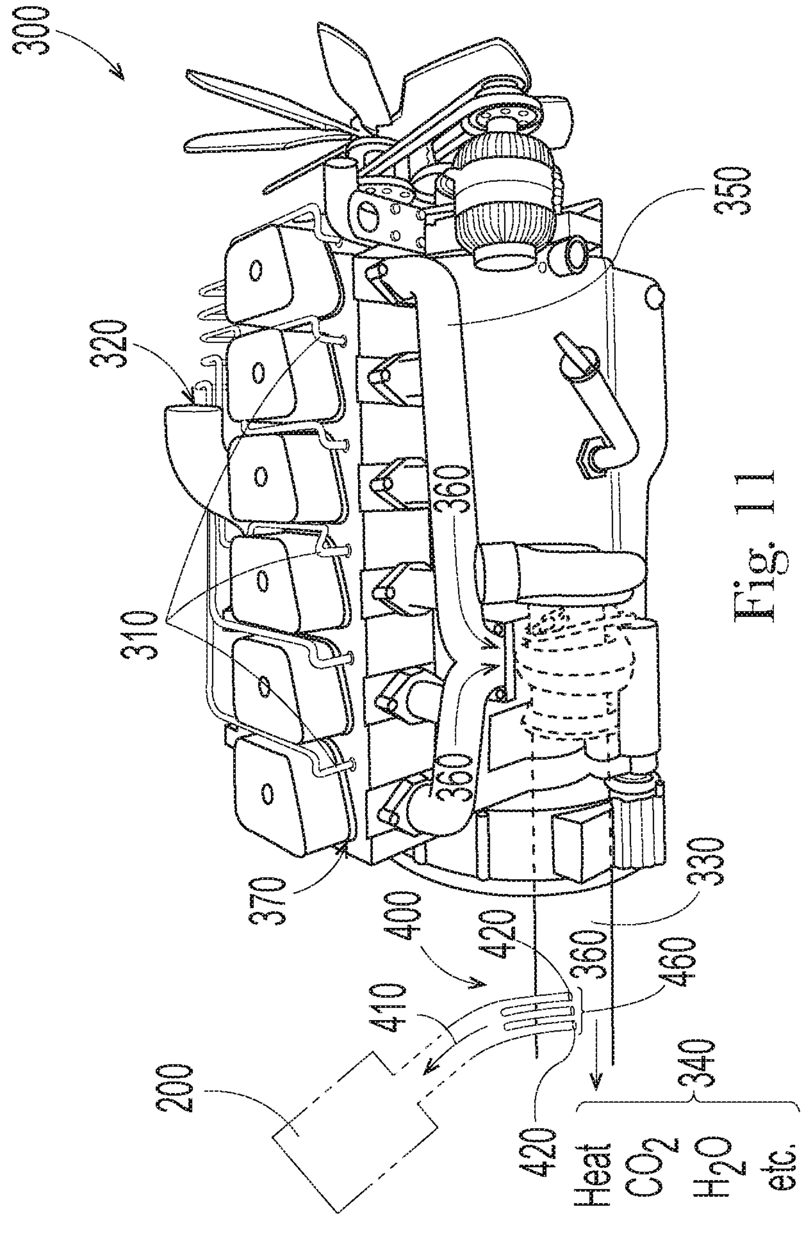

Referring to FIGS. 10 and 11, an exemplary, but non-limiting form of a heat source 300 can be an internal combustion engine. One of skill in the art understands that an internal combustion engine is an engine in which the burning of a fuel 310 occurs in a confined space called a combustion chamber 370. This exothermic reaction of fuel with an oxidizer (e.g., air 320) creates gases of high temperature and pressure that are permitted to expand within combustion chamber 370. The defining feature of an internal combustion engine is that useful work is performed by the expanding hot gases acting directly to cause movement, for example by acting on pistons, rotors, or even by pressing on and moving the entire engine itself. All internal combustion engines must have a method for achieving ignition in their cylinders to create combustion. Engines use either an electrical method or a compression ignition system.

An exemplary heat source 300 in the form of an electrical/gasoline-type ignition system (that can also run on other fuels as previously mentioned) generally rely on a combination of a lead-acid battery and an induction coil to provide a high voltage electrical spark to ignite the air-fuel mix in the engine's cylinders. This battery can be recharged during operation using an electricity-generating device, such as an alternator or generator driven by the engine. Gasoline engines take in a mixture of air and gasoline and compress to less than 170 psi and use a spark plug to ignite the mixture when it is compressed by the piston head in each cylinder.

An exemplary heat source 300 in the form of a compression ignition system, such as the diesel engine and HCCI (Homogeneous Charge Compression Ignition) engines, rely solely on heat and pressure created by the engine in its compression process for ignition. Compression that occurs is usually more than three times higher than a gasoline engine. Diesel engines will take in air only, and shortly before peak compression, a small quantity of diesel fuel is sprayed into the cylinder via a fuel injector that allows the fuel to instantly ignite. HCCI type engines will take in both air and fuel but will continue to rely on an unaided auto-combustion process due to higher pressures and heat. This is also why diesel and HCCI engines are also more susceptible to cold starting issues though they will run just as well in cold weather once started. Most diesels also have battery and charging systems however this system is secondary and is added by manufacturers as luxury for ease of starting, turning fuel on and off which can also be done via a switch or mechanical apparatus, and for running auxiliary electrical components and accessories. Most modern diesels, however, rely on electrical systems that also control the combustion process to increase efficiency and reduce emissions.

Once successfully ignited and burnt, the combustion products, in the form of hot gas eventually forming exhaust fluid stream 360, has more available energy than the original compressed fuel/air mixture (which had higher chemical energy). This available energy is manifested as high temperature and pressure that can be translated into work by the engine. In a reciprocating engine, the high pressure product gases inside the cylinders drive the engine's pistons.

Once the available energy has been removed, the remaining hot gases (i.e., exhaust fluid stream 360) are vented (often by opening a valve or exposing the exhaust outlet) and this allows the piston to return to its previous position (Top Dead Center-TDC). The piston can then proceed to the next phase of its cycle, which varies between engines. Any heat not translated into work is normally considered a waste product and is removed from the engine.

The major products of combustion 340 of the complete combustion of petroleum-based fuels in an internal combustion engine provided for heat source 300 are carbon dioxide (13%), water (13%), nitrogen from air (73%), and significant amounts of waste heat. In internal combustion engines, generally only 25% of the fuel energy is converted into useful power output and approximately 40% of it is lost in exhaust heat. The temperature of an engine exhaust fluid stream 360 can range from about 300° C. to 500° C. The exhaust fluid stream 360 from a typical internal combustion engine is usually vented away from the engine through elongate piping (i.e., an exhaust pipe 330).

Exemplary vehicles suitable for use, and consistent, with the present disclosure and incorporating a suitable heat source 300 can include, but not be limited to, semi-trucks, automobiles, ships, boats, airplanes, barges, dirigibles, and the like.

A non-limiting embodiment of a passive electromotive force (EMF) generator 400 can be provided as a form of thermocouple. As used herein, a 'passive EMF generator' is a device that is capable of generating an EMF 410 without the need for moving parts or externally-applied power to generate an EMF 410.

Figure 4:
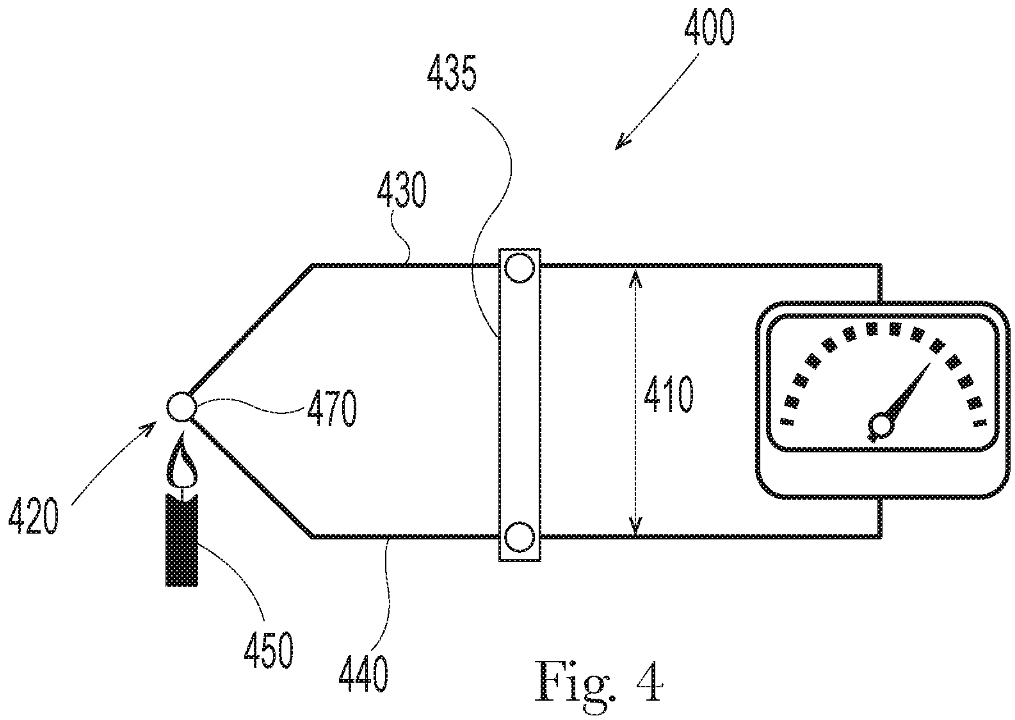
Fig. 4 (PRIOR ART)
FIG. 4 is a diagram of an exemplary thermocouple suitable for use as a passive electromotive force (EMF) generator for the system for transporting perishable goods of FIG. 10.

Referring to FIG. 4, a thermocouple 420 is an electrical device consisting of two dissimilar electrical conductors that form an electrical junction. A thermocouple produces a temperature-dependent voltage as a result of the Seebeck effect. The Seebeck effect refers to the development of an EMF across two points of an electrically conducting material when there is a temperature difference between those two points. In other words, one of skill in the art will understand that a thermo-electric current results when a magnetic needle is held near a circuit made of two dissimilar metals and one of the dissimilar metal junctions is heated.

In use herein, the voltage (EMF 410) generated at a single junction of the two different types of wire (e.g., wire type A 430 and wire type B 440 and separated by element 435) is what is of interest. The magnitude of the voltage depends on the types of wire being used and the temperature (heat source 450) that is subjected to. In some circumstances, the voltage can be in the microvolt range.

Figure 5:
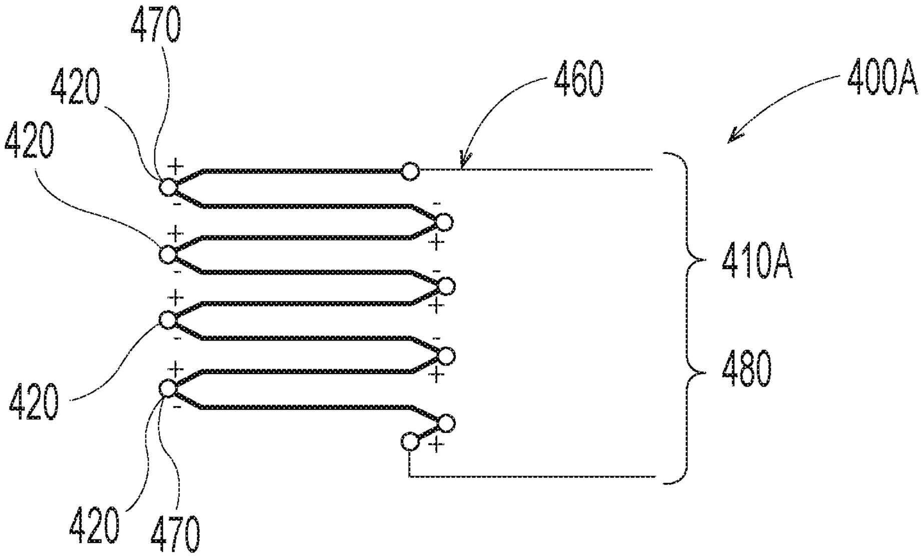
Fig. 5 (PRIOR ART)
FIG. 5 is a diagram of an exemplary thermopile suitable for use as a passive electromotive force (EMF) generator for the system for transporting perishable goods of FIG. 10.

Referring to FIG. 5, it was found that considerable voltages could be developed by using a plurality of thermocouples 420 connected in series (forming a thermopile 460), were of the correct configuration, and were subjected to combustion exhaust gasses. It was surprisingly found that, when properly designed, significant amounts of power (EMF) can be generated by a several series-connected thermocouple 420 junctions and thereby forming various thermopile 460 configurations.

As is known, thermocouples 420 are widely used in science and industry. For example, thermocouples 420 are widely used as temperature sensors. Commercial thermocouples 420 are inexpensive and interchangeable. Thermocouples 420 are also used in homes, offices and businesses as the temperature sensors in thermostats, and also as flame sensors in safety devices for gas-powered appliances.

The metal alloys chosen as thermocouple positive and negative leg wires (e.g., wire type A 430 and wire type B 440) define the type of thermocouple 420. One of skill in the art can select the proper thermocouple 420 type for a particular application and is typically determined by temperature expectations and by the environment in which the thermocouple 420 will be placed. Popular generic and trade names for the most common thermocouple 420 type wire 420, 440 combinations follow, as well as typical applications and limitations can include, but not be limited to: type K (Chromel®/Alumel® Temp. Range: (0 to 1260°) C [32 to 2300]° F.), type J (Iron/Constantan Temp. Range: (0 to 760°) C [32 to 1400]° F.), type T (Copper/Constantan Temp. Range: (−200 to 370°) C [−328 to 700]° F.), type E (Chromel®/Constantan Temp. Range: (0 to 870°) C [32 to 1600]° F.), type N (Nicrosil®/Nisil® Temp. Range: (0 to 1260°) C [32 to 2300]° F.), type S (Platinum/Platinum (10% Rhodium) Temp. Range: (538 to 1481°) C [1000 to 2700]° F.), type R (Platinum/Platinum (13% Rhodium) Temp. Range: (538 to 1481°) C [1000 to 2700]° F.), and type B (Platinum (6% Rhodium)/Platinum (30% Rhodium) Temp. Range: (871 to 1704°) C [1600 to 3100]° F.).

As discussed supra, and referring to FIG. 5, a passive electromotive force (EMF) generator 400A can be provided as a form of a plurality of thermocouples 420, also known as a thermopile 460. As used herein, a 'thermopile' is used as a passive electromotive force (EMF) generator 400 to generate electrical energy that results from the combustion process. The process is an example of the Peltier effect (electric current transferring heat energy) as the process transfers heat from the hot to the cold junctions.

It will be appreciated that a thermopile is a passive electronic device that converts thermal energy into electrical energy. As stated supra, a thermopile 460 can be composed of several thermocouples connected usually in series or, less commonly, in parallel. Such a device works on the aforementioned principle of the Seebeck thermoelectric effect— generating a voltage (EMF 410) when these dissimilar metals (thermocouples) are exposed to a temperature difference.

As explained supra, thermocouples operate by measuring the temperature differential from their junction point 470 to the point in which the thermocouple output 480 voltage is measured. Once a closed circuit is made up of more than one metal and there is a difference in temperature between the junctions and points of transition from one metal to another, a current is produced as if it were generated by a difference of potential between the hot and cold junction.

Thermocouples 460 can be connected in series as thermocouple 420 pairs with a junction located on either side of a thermal resistance layer. The output from the thermocouple 420 pair will be a voltage that is directly proportional to the temperature difference across the thermal resistance layer and also to the heat flux through the thermal resistance layer. Adding more thermocouple 420 pairs in series increases the magnitude of the voltage output. Thermopiles 460 can be constructed with a single thermocouple 420 pair, composed of two thermocouple 420 junctions, or multiple thermocouple 420 pairs (4 pairs, 6 pairs, 10 pairs, 20 pairs, and the like). One of skill in the art will recognize that the selection of the number of thermocouple 420 pairs can be decided by the desired output EMF 410A. By way of example only, if a high output EMF 410 is required, one of skill in the art may decide to utilize a correspondingly high number of thermocouple 420 pairs.

Thermopiles 460 do not respond to an absolute temperature, but generate an output EMF 410A proportional to a local temperature difference or temperature gradient. The amount of EMF 410A and power can be milli-watts and milli-volts, or watts and volts. This amount can be suitable for use with control devices that are specifically designed for such purpose.

One of skill in the art will recognize that a plurality of processes and equipment are available and under development that enable the re-constitution (recharging) of PCMs. A few of these exemplary systems are discussed infra. It is believed that such a phase change material re-constitution system can be operated effectively at the voltages delivered by a properly sized passive electromotive force (EMF) generator 400.

Figure 6:
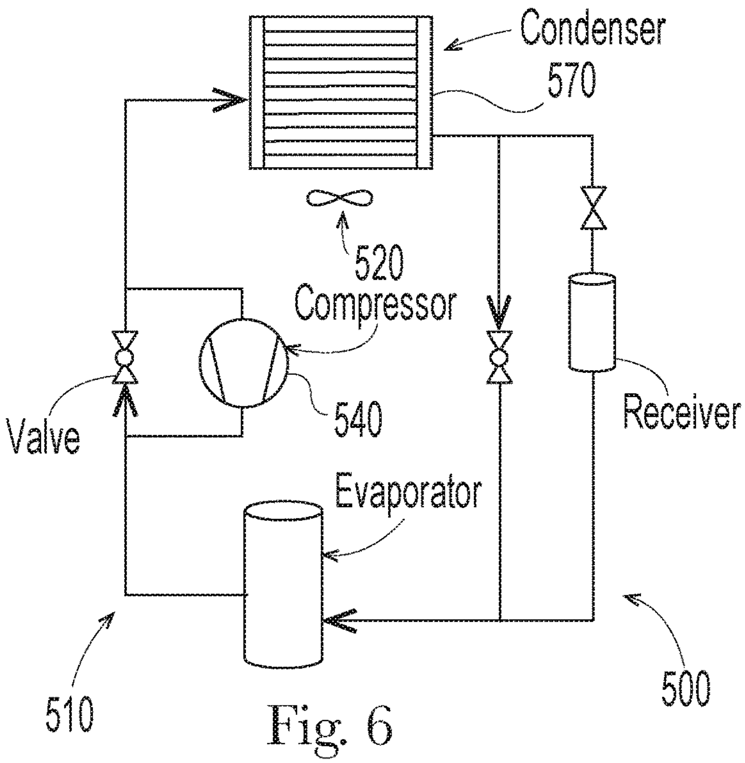
Fig. 6 (PRIOR ART)
FIG. 6 is a diagram of an exemplary device suitable for use as a phase change material (PCM) re-constitution system for the system for transporting perishable goods of FIG. 10.

Referring to FIG. 6, an exemplary, but non-limiting, phase change material reconstitution system 500 can utilize an apparatus 510. It is believed that such apparatus 510 can be adapted to deliver cooling to the desired target (i.e., PCMs). One of skill in the art will understand that an apparatus 510 uses a vapor compression system 540/570 to deliver cooling to its target. An apparatus 510 operation only requires a fan 520 to operate and consumes about 7 W of power. See Dhuhmane, R., et al., Transient Modeling of a Thermoplastic based Air Conditioner with Compact Thermal Storage: Modeling and Validation, 16$^{th}$ International Refrigeration and Air Conditioning Conference at Purdue, Jul. 11-14, 2016.

Figure 7:
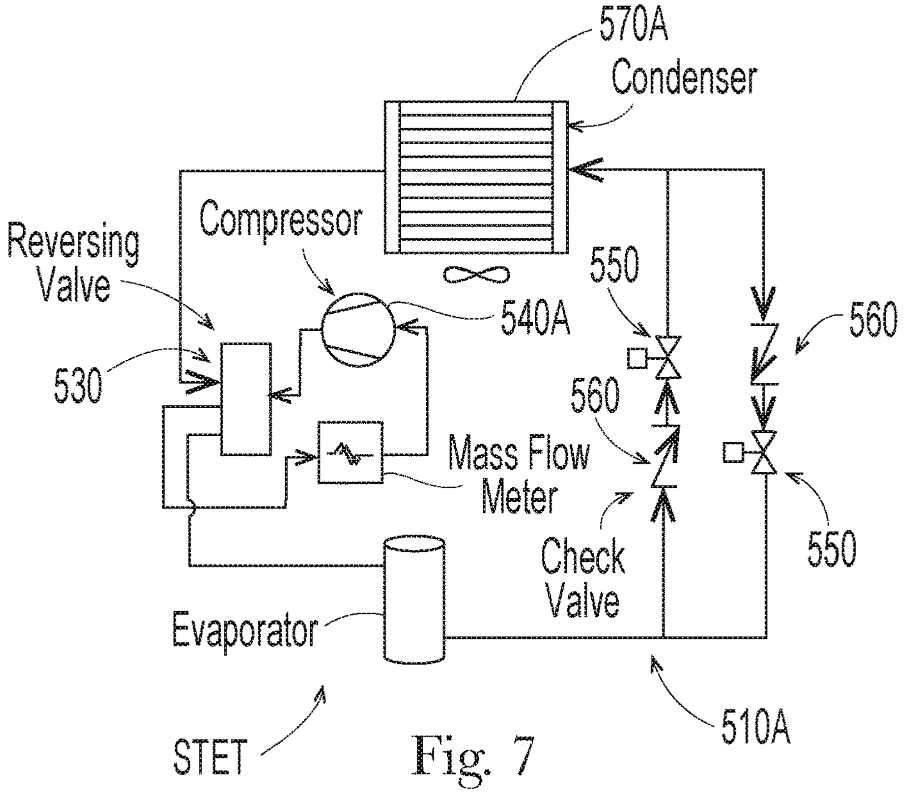
Fig. 7 (PRIOR ART)
FIG. 7 is a diagram of another exemplary device suitable for use as a phase change material (PCM) re-constitution system for the system for transporting perishable goods of FIG. 10.

Referring to FIG. 7, another exemplary, but non-limiting, phase change material re-constitution system 500A can comprise a heat pump 510A. A reversible four-way valve 530 can be used to change the refrigerant flow direction from the compressor 540A and recharge the PCM 200 by operating the PCM 200 storage as an evaporator. The compressor 540A can be a variable-speed type and the recharge time may be controlled by adjusting its RPM. There are two Thermostatic Expansion Valves (TXV) 550 in the circuit for the heat pump 510A, each protected by a check valve 560. The bulbs of the TXV 550 are connected to outlet of either the air to refrigerant heat exchanger 510A or the phase change material heat exchanger (PCM-HX). During the cooling operation, the outlet of air to refrigerant heat exchanger 570A (marked as condenser in FIG. 1) is connected to the bulb of TXV 550, while the outlet of PCM-HX is connected to the bulb of the second TXV 550. The second TXV 550 is operational during the heat pump 510A operation. See Dhumane, R., et al., Evaluating Recharge Options for Phase Change Material Storage of a Personal Conditioning System, 5th International High Performance Buildings Conference at Purdue, Jul. 9-12, 2018

Still another exemplary, but non-limiting, phase change material re-constitution system 500 can comprise a heat pipe (not shown). An exemplary reversible heat-pipe-assisted thermal storage system can provide an evaporator and a condenser in direct contact with a heat pipe. During the charging process, a water tank can provide a heat sink. The heat is efficiently transferred from the surface of the PCM 200 to a heat pipe that in direct contact with the PCM. During the charging process, heat is transferred from the PCM 200 to the water tank. See Behi, H., et al., Enhancement of the Thermal Energy Storage Using Heat-Pipe-Assisted Phase Change Material, Energies 2021, 14, 6176 Simply stated, a portion of a heat pipe is appropriately disposed inside, or proximate to, the PCM 200 and the remaining portion of the heat pipe is exposed to the thermal bath at a constant temperature. A thermal insulation cover can be used to insulate the PCM 200 storage to minimize ambient heat transfer.

Figure 8:
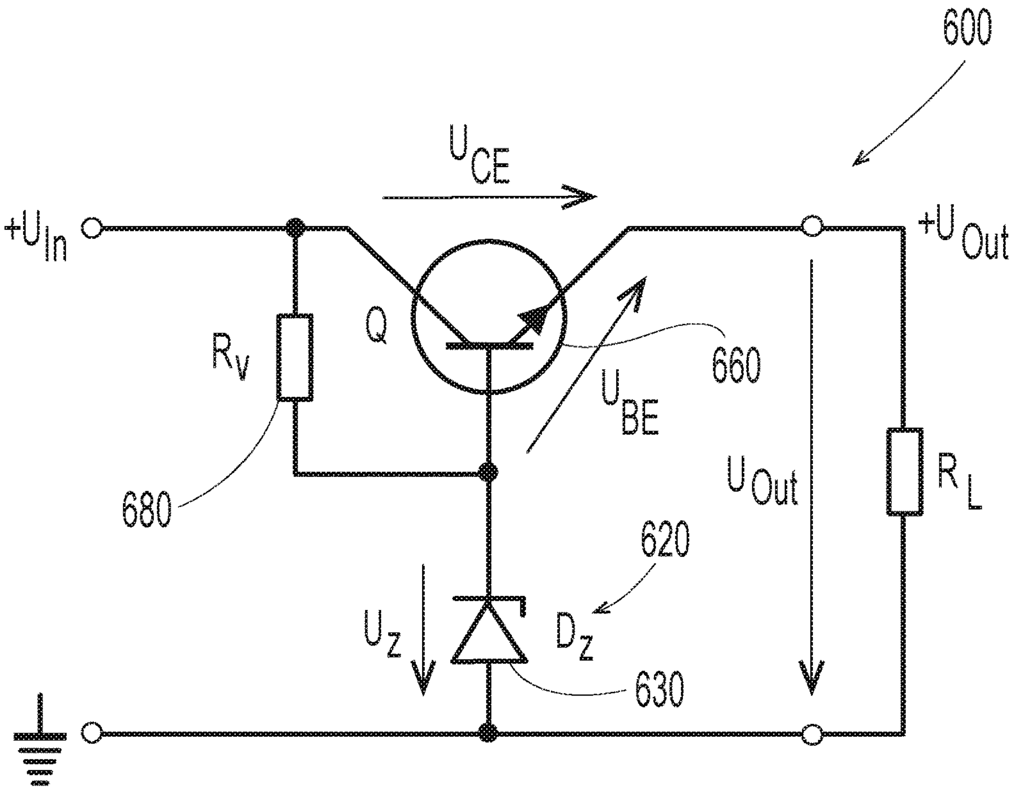
Fig. 8 (PRIOR ART)
FIG. 8 is an electrical diagram for an exemplary voltage regulator suitable for use with the output of a passive electromotive force (EMF) generator for the system for transporting perishable goods of FIG. 10.
Figure 9:
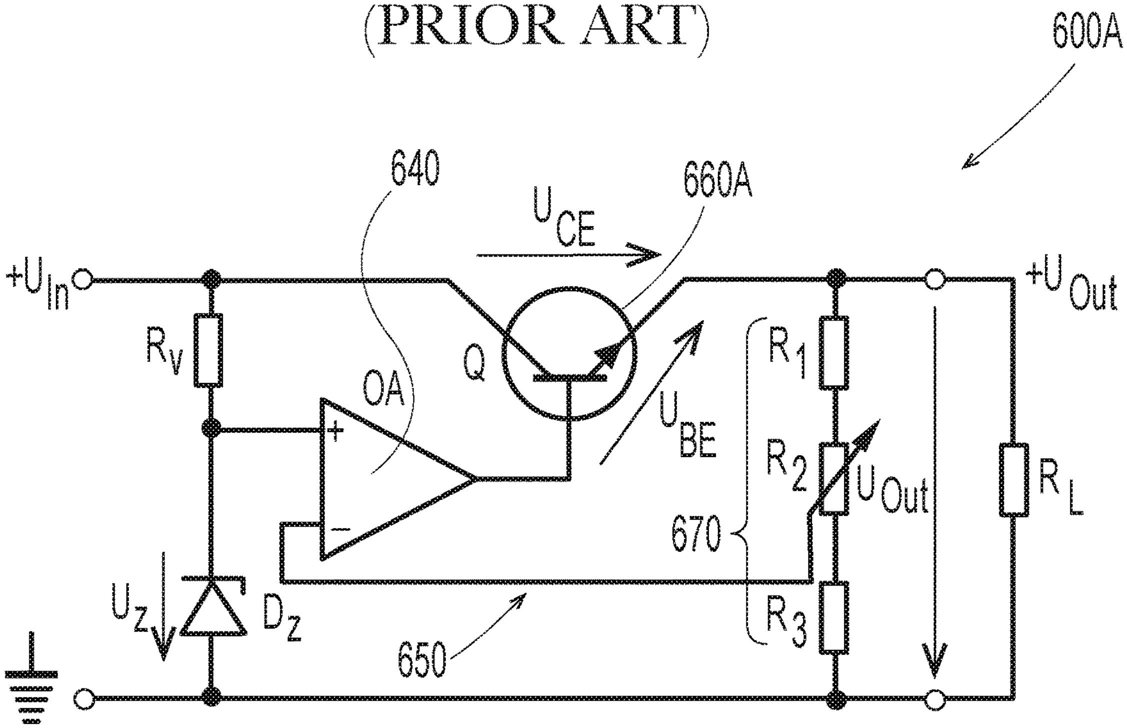
Fig. 9 (PRIOR ART)
FIG. 9 is another electrical diagram for an exemplary voltage regulator suitable for use with the output of a passive electromotive force (EMF) generator for the system for transporting perishable goods of FIG. 10.

Referring to FIGS. 8 and 9, the voltage developed by the exemplary thermocouples and/or thermopiles discussed supra can be converted and regulated by an exemplary voltage regulator 600, 600A. One of skill in the art will understand that a voltage regulator 600, 600A is a system designed to automatically maintain a constant voltage. A voltage regulator 600, 600A may use a simple feed-forward design or may include negative feedback. It may use an electromechanical mechanism, or electronic components. Depending on the design, it may be used to regulate one or more AC or DC voltages.

A simple voltage/current regulator 600 can be made from a resistor 680 in series with a diode 620 (or series of diodes). When precise voltage control and efficiency are not important, this design may be fine. Since the forward voltage of a diode 620 is small, this kind of voltage regulator can be suitable for low voltage regulated output. When higher voltage output is needed, a zener diode 630 or series of zener diodes may be used. Zener diode 630 regulators make use of the zener diode's 630 fixed reverse voltage, which can be quite large.

Feedback voltage regulators 600A operate by comparing the actual output voltage to some fixed reference voltage. Any difference is amplified by an op-amp 640 and used to control the regulation element in such a way as to reduce the voltage error. This forms a negative feedback control loop 650; increasing the open-loop gain tends to increase regulation accuracy but reduce stability. One of skill in the art will recognized that stability is avoidance of oscillation, or ringing, during step changes. There will also be a trade-off between stability and the speed of the response to changes. If the output voltage is too low (perhaps due to input voltage reducing or load current increasing), the regulation element is commanded, up to a point, to produce a higher output voltage—by dropping less of the input voltage (for linear series regulators and buck switching regulators), or to draw input current for longer periods (boost-type switching regulators). If the output voltage is too high, the regulation element will normally be commanded to produce a lower voltage.

As shown in FIG. 8, one of skill in the art will recognize an exemplary voltage regulator 600 as a common collector amplifier. The simple transistor 660 regulator can provide a relatively constant output voltage $U_{out}$ for changes in the voltage $U_{in}$ of the power source and for changes in load $R_L$, provided that $U_{in}$ exceeds $U_{out}$ by a sufficient margin and that the power handling capacity of the transistor is not exceeded. If the output voltage drops for any external reason, such as an increase in the current drawn by the load, the transistor's 660 base-emitter voltage ($U_{BE}$) increases, turning the transistor 660 on further and delivering more current to increase the load voltage again.

As shown in FIG. 9, The stability of the output voltage can be significantly increased by using an operational amplifier 640. In this case, the operational amplifier 640 drives the transistor 660A with more current if the voltage at its inverting input drops below the output of the voltage reference at the non-inverting input. Using the voltage divider 670 ($R_1$, $R_2$ and $R_3$) allows choice of the arbitrary output voltage between $U_z$ and $U_{in}$.

FIG. 10 depicts an exemplary, but non-limiting, embodiment of a system for transporting perishable goods 100. The system for transporting perishable goods 100 incorporates the use of phase change materials (PCM) 200 and a passive electromotive force (EMF) generator 400 to utilize the waste heat by-products of combustion from a heat source 300 (such as an internal combustion engine) to produce an EMF suitable for operating a phase change material re-constitution system 500 to recharge the PCM 200 to an initial thermal state. In one non-limiting embodiment, the system for transporting perishable goods 100 can incorporate the use of a voltage regulator 600 to moderate and control the EMF (voltage) produced by the passive electromotive force (EMF) generator 400 into a range suitable for the efficient operation of the phase change material re-constitution system 500.

In one non-limiting example of the present disclosure, the perishable goods transportation device 110 suitable for use with the system for transporting perishable goods 100 can be provided as a refrigerated semi-trailer (or reefer) 120. A semi-trailer is a trailer without a front axle that is mechanically and pivotably connected to, and pulled by, a tractor unit 130. One of skill in the art would appreciate that the refrigerated semi-trailer 120 is intended to be capable of refrigeration and can be sized as required by the user for the transportation of perishable goods. The perishable goods can be provided with refrigeration and/or heating by the system for transporting perishable goods 100 as may be required by the specific product being transported by the perishable goods transportation device 110. It should be noted that a refrigerated truck (e.g., the refrigeration capability is intimately and non-removably connected to the motive portion of the truck) should be considered as equivalent to a refrigerated semi-trailer 120 operably coupled to a tractor unit 130. Therefore, the elements of the present disclosure should be recognized a suitable for use by either a refrigerated semi-trailer 120/tractor unit 130 combination, a refrigerated truck, or any other vehicle and or device intend for the transportation of perishable goods.

The walls 140 of the refrigerated semi-trailer 120 form a container (e.g., an envelope) that can be provided with a phase change material (PCM) 200, discussed infra, disposed therein or thereupon. Referring to FIG. 3 and as provided supra, one of skill in the art will understand that a PCM 200 are substances that release and/or absorb energy to provide useful heat and/or cooling. In other words, a PCM 200 can be provided at a first thermodynamic state 210 and emit/absorb energy (i.e., PCM 200 undergoes a first change in enthalpy over time 230A (also ΔH)) as the PCM 200 transitions to a second thermodynamic state 220. Upon reaching the second thermodynamic state 220, energy must be either provided to/removed from the PCM 200 in order for the PCM 200 to transition from the second thermodynamic state back to the first thermodynamic state 210.

In other words, the refrigerated semi-trailer comprises a PCM 200 having a first thermodynamic state disposed therein. The PCM 200 having a first thermodynamic state has a first change in enthalpy over time when the PCM 200 transitions to a second thermodynamic state. This first change in enthalpy over time of the PCM 200 can either heat and/or cool any perishable goods that may be disposed within the refrigerated semi-trailer 120 of the perishable goods transportation device 110 as may be required by the user of the system for transporting perishable goods 100.

Returning again to FIG. 10, and as provided supra, the refrigerated semi-trailer 120 envelope represents a 'shield' that effectively wraps the refrigerated semi-trailer 120 and separates the internal atmosphere (environment) of the refrigerated semi-trailer 120 from the environment outside the refrigerated semi-trailer 120 by its constituent elements, such as the roof, floor, and side walls. In this manner, the refrigerated semi-trailer 120 can regulate the internal thermal loads as well as impact the need for internal heating and/or cooling.

It is believed that the application of PCM 200 to form an environmental envelope within a refrigerated semi-trailer 120 is a surprising and revolutionary approach to enhance the thermal mass of the refrigerated semi-trailer 120 structure. As a result, the overall thermodynamic performance of the refrigerated semi-trailer 120 can be improved significantly. As has been explained supra, PCMs can be applied into the refrigerated semi-trailer 120 envelope using numerous techniques and in numerous configurations. These numerous techniques and configurations can be provided in a manner that provides the PCM 200 as part of the construction materials or in a 'retro-fit kit' that can ensure maximum utilization of the thermodynamic heat storage potential of the refrigerated semi-trailer 120.

By way of non-limiting example, the PCM 200 can be incorporated into the envelope of the refrigerated semi-trailer 120 (i.e., the walls of refrigerated semi-trailer 120) during construction. In this embodiment, one of skill in the art could reasonably apply the PCM 200 to the external wall of the trailer 120 envelope in the form of a foam. Containment of the PCM 200 can then be accomplished by the placement of an internal wall to effectively cover the PCM 200 disposed upon the external wall thereby effectively encapsulating the PCM 200 between the outer and inner walls of refrigerated semi-trailer 120 forming the envelope in a sandwich-like fashion.

Figure 12:
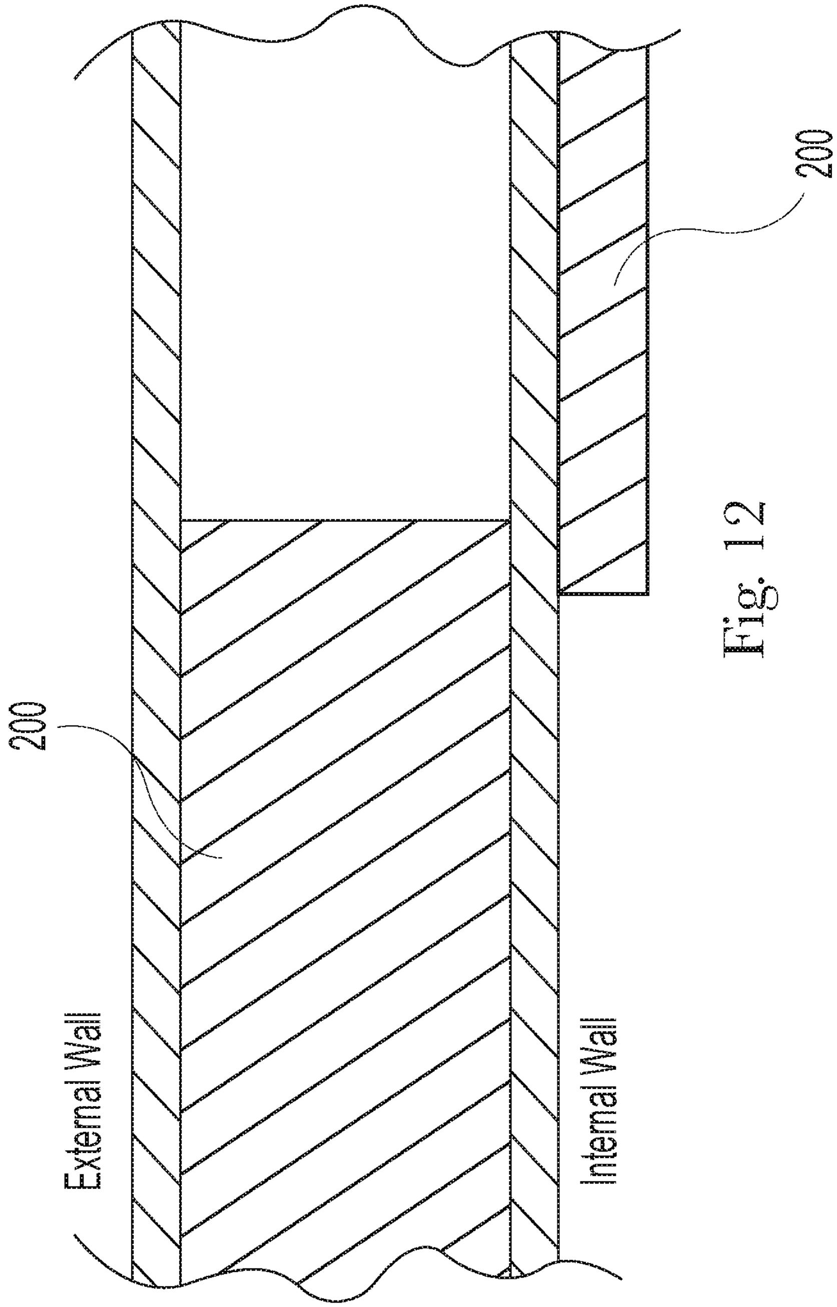
FIG. 12 is a schematic, fragmentary, top plan view of phase change material (PCM) panels disposed on the walls of a refrigerated semi-trailer.

Referring to FIG. 12, the PCM 200A can be formed into panels that can be cooperatively, fixably and matingly attached to the exterior wall of the envelope prior to the fixable attachment of the interior wall of the trailer in mating contact with the PCM 200A panel effectively encapsulating the PCM 200 between the outer and inner walls of the refrigerated semi-trailer 120.

In still yet another alternative embodiment, the PCM 200B can be formed into panels that can be matingly and fixably attached to the interior wall of the refrigerated semi-trailer 120. In this manner it is believed that PCM 200B can be incorporated into already produced trailer systems in a manner that can retro-fit the existing trailer into a form consistent with the disclosure provided herein. In other words, a refrigerated semi-trailer 120 can be retro-fitted with such PCM 200B panels in order to take advantage of potential realizable cost savings introduced by the system for transporting perishable goods 100. Additionally, a previously non-refrigerated semi-trailer can be converted into a refrigerated semi-trailer 120 by the placement and fixable attachment of PCM 200B panels in order to take advantage of any and all potentially realizable cost savings introduced by the system for transporting perishable goods 100.

The system for transporting perishable goods 100 can also incorporate the use of a heat source 300 in the form of an internal combustion engine disposed within tractor unit 130 that is used to provide a motive force to refrigerated semi-trailer 120. One of skill in the art will appreciate that most tractor units 130 utilize a diesel-powered fuel internal combustion engine. However, one of skill in the art will understand that gasoline-powered internal combustions engines, steam engines and the like are suitable for use as tractor units 130 suitable for moving refrigerated semi-trailer 120.

Referring to FIG. 11, as discussed supra, an exemplary heat source 300 will provide for, and support, the mixture and combustion of a fuel 310 (typically a hydrocarbon-based fuel) with air 320 (generally comprising oxygen and nitrogen). After combustion of the fuel 310, the products of combustion 340 (also referred to as combustion by-products 340 herein) are exhausted from heat source 300 to the atmosphere via exhaust pipe 330.

One of skill in the art will appreciate that spark-ignition gasoline and compression-ignition diesel engines differ in how they supply and ignite the fuel 310. In a spark-ignition engine, the fuel 310 is mixed with air 320 and then inductively conveyed into the engine cylinder during the intake process. After the piston compresses the fuel-air mixture, the spark ignites it, causing combustion. The expansion of the exhaust gas comprising the products of combustion 340 push the piston during the power stroke. In a diesel engine, only air 320 is inducted into the engine and then compressed. Diesel engines then spray the fuel 310 into the hot compressed air 320 at a suitable, measured rate, causing it to ignite.

The exhaust gas, or flue gas, is emitted as a result of the combustion of fuels 310 such as natural gas, gasoline (petrol), diesel fuel, fuel oil, biodiesel blends, or coal. According to the type of engine, it is discharged into the atmosphere through an exhaust pipe 330 (also called a flue gas stack, or propelling nozzle) that is fluidly coupled to heat source 300 via manifold 350. The largest part of the products of combustion 340 include, but are not limited to, nitrogen ($N_2$), water vapor ($H_2O$) (except with pure-carbon fuels), carbon dioxide ($CO_2$), and significant amounts of heat.

One of skill in the art will appreciate that a heat source 300 suitable for use with tractor unit 130 of perishable goods transportation device 110 can be include any type of heat source utilized in the propulsion of vehicles. This can include thermal engines (e.g., internal combustion engines, external combustion engines (e.g., steam engines, Stirling engines, liquid organic Rankine cycle engines, and the like), reaction engines (e.g., jet engines and rocket engines), combinations thereof, and the like. Further, one of skill in the art will recognize that a heat source 300 (engine) can be incorporated into a plurality of vehicles that may be required to generate motive forces. This can include, but not be limited to, trucks, automobiles, ships, aircraft, submarines, balloons, dirigibles, rockets, and the like.

Referring again to FIG. 10, the combustion by-products 340 can be provided as an exhaust fluid stream 360 fluidly routed away from heat source 300 though manifold 350 and exhaust pipe 330 and vented to the atmosphere. At least one passive electromotive force (EMF) generator 400 is disposed within the exhaust pipe 330 or even manifold 350 and in contacting and fluid engagement with the combustion by-products 340 emitted from heat source 300 in exhaust fluid stream 360. In one embodiment, the at least one passive EMF generator 400 is provided as at least one thermocouple. In yet another embodiment, passive EMF generator 400 can be provided as at least two thermocouples. In yet another embedment, passive EMF generator 400 is provided as a thermopile comprising a plurality of thermocouples. In yet still another embodiment passive EMF generator 400 can be provided as a plurality of thermopiles, each comprising a plurality of thermocouples. One of skill in the art will understand that a plurality of thermocouples and/or thermopiles can each be consecutively disposed along manifold 350 and/or exhaust pipe 330 and efficaciously disposed within combustion by-products 340 disposed in fluid exhaust stream 360. One of skill in the art will appreciate that the temperature (i.e., heat) of combustion by-products 340 would be higher in a region proximate to the connection of heat source 300 to manifold 350. As the combustion by-products 340 disposed in exhaust fluid stream 360 continuously flow through manifold 350 and exhaust pipe 330, the temperature decreases. Therefore, one of skill in the art would recognize that the placement of passive EMF generator 400 proximate to the region proximate to the connection of heat source 300 to manifold 350 could necessarily realize an increase in EMF output by passive EMF generator 400. However, without desiring to be bound by theory, it is believed that the sequential placement of passive EMF generators 400 along the length of manifold 350 and/or exhaust pipe 330 can result in significant EMF output by passive EMF generator 400.

Each passive EMF generator 340 employed by the system for transporting perishable goods 100 is capable of generating an EMF 410 due to the fluid engagement with the combustion by-products 340 routed away from heat source 300 though manifold 350/exhaust pipe 330. One of skill in the art will appreciate that the EMF generated by each passive EMF generator 400 can be directed to any system electrically coupled to the tractor unit 130 used by the system for transporting perishable goods 100. Such systems can be used to provide at least a portion of the EMF 410 utilized to operate a system operatively coupled to, and/or electrically coupled to, tractor unit 130. This can include exemplary, but non-limiting, systems such as the engine, fuel systems, transmission systems, electrical systems, cooling and lubrication systems, the chassis, suspension systems, braking systems, wheels and tires, the vehicle body, auxiliary systems, combinations thereof, and the like. One of skill in the art will appreciate that the EMF 410 generated by passive EMF generators 400 can be used by any vehicle utilizing a heat source 300 to provide motive force. This can include automobiles, airplanes, busses, boats, trains, and the like.

Referring yet again to FIG. 10, the EMF 410 generated by passive EMF generator 400, can be directed to an optional voltage regulator 600 provided in operable, cooperative, and electrical communication with the output of passive EMF generator 400. As discussed supra, one of skill in the art will understand that the EMF 410 generated by passive EMF generator 400 can be conditioned, transformed, or otherwise modified by voltage regulator 600 into a form suitable for the desired application and/or output. By way of non-limiting example, voltage regulator 600 can transform the EMF 410 generated by passive EMF generator 400 to a voltage (e.g., a 'standard' 12 VDC) suitable for use by tractor unit 130 and/or any systems operably, cooperatively, and electrically associated thereto as described supra. Alternatively, the EMF 410 generated by passive EMF generator 400 can be conditioned, transformed, or otherwise modified into output 610 suitable for use by phase change material re-constitution system 500. Yet still, the EMF 410 generated by passive EMF generator 400 can be conditioned, transformed, or otherwise modified by voltage regulator 600 as needed for use by any device that may require EMF for operation.

The output 610 of voltage regulator 600, or the EMF directly created by passive EMF generator 400, can then be electrically communicated to phase change material re-constitution system 500 (also referred to as re-constitution system 500 herein). As discussed supra, PCMs 200 are thermodynamic substances that absorb or release substantial amounts of latent heat when they go through a change in their physical state (i.e., from solid to liquid and vice versa). The operation of the system for transporting perishable goods 100 depends on the thermodynamic shift in phase of the PCM 200 for holding and releasing this latent energy. For instance, processes such as melting, solidification, or evaporation require energy. This energy is absorbed or released when the PCM 200 changes from solid to liquid and vice versa. The use of re-constitution system 500 can infuse PCM 200 with energy that can restore PCM 200 to any desired initial state.

In other words, the phase change material re-constitution system 500 can provide a second change in enthalpy over time 230B. The second change in enthalpy over time 230B can cause the PCM 200 in the second thermodynamic state 220 to transition from the second thermodynamic state 220 to the first thermodynamic state 210.

In any regard, the electrical coupling of the output 610 of voltage regulator 600 or the EMF directly created by passive EMF generator 400 to re-constitution system 500 can facilitate the electrical operation of re-constitution system 500 to enable recharging PCM 200 as may be required by the system for transporting perishable goods 100. The PCM re-constitution system 500 may be coupled to the PCM 200 through non-contacting engagement.

As discussed supra, re-constitution system 500 can utilize a thermosiphon, a heat pump, a heat pipe, combinations thereof, and the like. Re-constitution system 500 is preferably operably coupled to PCM 200 disposed within refrigerated semi-trailer 120. Such operable coupling can be provided in direct physical contact with PCM 200 (to provide direct cooling/heating to PCM 200) or proximate physical contact (i.e., con-contacting engagement) with PCM 200 (as would be done by one of skill in the art to provide indirect heating to PCM 200), and combinations thereof. In any regard, it is preferred that re-constitution system 500 provide any necessary thermodynamic shift in phase of the PCM 200 to enable PCM 200 to hold and ultimately release latent energy.

It should be recalled that PCM 200 can be incorporated into refrigerated semi-trailer 120 during construction, into formed panels that can be fixably and matingly attached to the exterior wall(s) of refrigerated semi-trailer 120 prior to the placement of the interior wall of the refrigerated semi-trailer 120 in mating contact with the PCM 200A panel and fixable attachment thereto, or into panels that can be matingly and fixably attached to the interior wall of refrigerated semi-trailer 120. Re-constitution system 500, operably and electrically connected to the current 610 of voltage regulator 600, or the EMF directly created by passive EMF generator 400, can be energized as may be required, in order for the reconstitution system 500 to recharge the PCM 200 disposed within vehicle 110 or reefer 120. The recharged PCM 200 is then prepared and ready to use by the vehicle 110 or reefer 120 to continue the transport of perishable goods by vehicle 110 or reefer 120.

Any dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for transporting perishable goods comprising:

a perishable goods transportation device for containing and transporting perishable goods, said perishable goods transportation device comprising a refrigerated semi-trailer for containing said perishable goods disposed within said refrigerated semi-trailer, said refrigerated semi-trailer comprising a phase change material disposed in a first thermodynamic state and disposed within said refrigerated semi-trailer, said phase change material transitioning from said first thermodynamic state to a second thermodynamic state with a first change in enthalpy over time, said first change in enthalpy over time of said phase change material heating or cooling said perishable goods disposed within said refrigerated semi-trailer of said perishable goods transportation device;

said perishable goods transportation device further comprising a heat source;

at least one passive electromotive force generator, said passive generator generating an electromotive force when said electromotive force generator is operably coupled to said heat source;

a phase change material re-constitution system operably coupled to said phase change material, said phase change material re-constitution system being in electrical communication with said passive electromotive force generator, said phase change material re-constitution system providing a second change in enthalpy over time to said phase change material, said second change in enthalpy over time causing said phase change material disposed in said second thermodynamic state to transition from said second thermodynamic state to said first thermodynamic state.

2. The system for transporting perishable goods of claim 1 further comprising a tractor unit operatively coupled to and providing motive force for said refrigerated semi-trailer, said heat source being disposed in said tractor unit.

3. The system for transporting perishable goods of claim 1, wherein said heat source supports mixture and combustion of a fuel with air and exhausts products of combustion through an exhaust pipe operatively and mechanically connected to said heat source, said products of combustion being exhausted to atmosphere though said exhaust pipe.

4. The system for transporting perishable goods of claim 3 wherein said at least one passive electromotive force generator is disposed inside said exhaust pipe and in fluid contact with said products of combustion.

5. The system for transporting perishable goods of claim 4 wherein said at least one passive electromotive force generator comprises a plurality of passive electromotive force generators.

6. The system for transporting perishable goods of claim 4 wherein said at least one passive EMF generator is a thermocouple.

7. The system for transporting perishable goods of claim 4 wherein said at least one passive electromotive force generator is a thermopile.

8. The system for transporting perishable goods of claim 1 wherein said at least one passive EMF generator is a thermocouple.

9. The system for transporting perishable goods of claim 8 wherein said thermocouple is selected from the group consisting of type K thermocouples, type J thermocouples, type T thermocouples, type E thermocouples, type N thermocouples, type R thermocouples, type B thermocouples, and combinations thereof.

10. The system for transporting perishable goods of claim 1 wherein said at least one passive EMF generator is a thermopile.

11. The system for transporting perishable goods of claim 1 wherein said phase change material is selected from the group consisting of hydrocarbons, lipids, sugar alcohols, and combinations thereof.

12. The system for transporting perishable goods of claim 1 wherein said phase change material is incorporated into an envelope of said refrigerated semi-trailer as a foam contained within an external wall and an internal wall of said refrigerated semi-trailer.

13. The system for transporting perishable goods of claim 1 wherein said phase change material is provided as a panel disposed within an external wall and an internal wall of said refrigerated semi-trailer.

14. The system for transporting perishable goods of claim 1 wherein said phase change material is provided as a panel disposed upon an internal wall of said refrigerated semi-trailer.

15. The system for transporting perishable goods of claim 1 wherein said heat source is selected from the group consisting of thermal engines, internal combustion engines, reaction engines, and combinations thereof.

16. The system for transporting perishable goods of claim 1 wherein said PCM re-constitution system is a heat pump.

17. The system for transporting perishable goods of claim 1 wherein said phase change material is encapsulated.

* * * * *